(12) United States Patent
Venturini

(10) Patent No.: US 10,094,665 B2
(45) Date of Patent: Oct. 9, 2018

(54) SYSTEMS AND METHODS FOR REPORTING OBJECTS OF INTEREST

(71) Applicant: The Boeing Company, Seal Beach, CA (US)

(72) Inventor: Luca Venturini, Carrara (IT)

(73) Assignee: The Boeing Company, Chicago, IL (US)

( * ) Notice: Subject to any disclaimer, the term of this patent is extended or adjusted under 35 U.S.C. 154(b) by 764 days.

(21) Appl. No.: 13/863,438

(22) Filed: Apr. 16, 2013

(65) Prior Publication Data

US 2014/0310234 A1    Oct. 16, 2014

(51) Int. Cl.
| | |
|---|---|
| G06F 7/00 | (2006.01) |
| G06F 17/00 | (2006.01) |
| G01C 21/00 | (2006.01) |
| G01C 21/20 | (2006.01) |
| G01C 21/22 | (2006.01) |

(52) U.S. Cl.
CPC .......... *G01C 21/00* (2013.01); *G01C 21/203* (2013.01); *G01C 21/22* (2013.01)

(58) Field of Classification Search
USPC ........................................................ 707/603
See application file for complete search history.

(56) References Cited

U.S. PATENT DOCUMENTS

| | | | | |
|---|---|---|---|---|
| 4,939,661 A | * | 7/1990 | Barker ................... | G01C 21/22 342/452 |
| 5,268,844 A | * | 12/1993 | Carver ................... | G01C 21/22 342/452 |
| 7,973,705 B2 | | 7/2011 | Cunning et al. | |
| 8,009,191 B2 | | 8/2011 | Skjelten et al. | |
| 2003/0023476 A1 | * | 1/2003 | Gainey ............ | G06Q 10/06398 705/7.42 |
| 2003/0205187 A1 | * | 11/2003 | Carlson ............... | G01F 23/0069 114/125 |

(Continued)

FOREIGN PATENT DOCUMENTS

| | | |
|---|---|---|
| EP | 2199745 A2 | 6/2010 |
| EP | 2458336 A1 | 5/2012 |
| JP | 2000-182199 A | 6/2000 |
| JP | 2008-198214 A | 8/2008 |

OTHER PUBLICATIONS

Extended European Search Report of Application No. 14158012.6; dated Feb. 17, 2015; 8 pages.
JPO Office Action for related application 2014-083369 dated Feb. 27, 2018; 5 pp.

*Primary Examiner* — Tuan A Pham
(74) *Attorney, Agent, or Firm* — Armstrong Teasdale LLP

(57) ABSTRACT

A computing device is provided. The computing device includes a user interface configured to receive an input that indicates a user has detected an object of interest in a body of water, a processing device coupled to the user interface, the processing device configured to automatically retrieve, in response to the input, data from at least one data source, and generate a report including the retrieved data, and a means for transmitting data coupled to the processing device and configured to transmit the generated report to a database that includes a plurality of navigational charts, wherein the generated report is used to update at least one of the database and at least one of the plurality of navigational charts to include the object of interest.

16 Claims, 3 Drawing Sheets

(56) References Cited

U.S. PATENT DOCUMENTS

| | | | |
|---|---|---|---|
| 2006/0290562 A1 | 12/2006 | Ehresman | |
| 2007/0006101 A1* | 1/2007 | Michaels | B63J 99/00 |
| | | | 715/866 |
| 2009/0228195 A1 | 9/2009 | Lutz et al. | |
| 2009/0285491 A1* | 11/2009 | Ravenscroft | G08G 5/06 |
| | | | 382/203 |
| 2010/0199225 A1* | 8/2010 | Coleman | G06F 3/038 |
| | | | 715/858 |
| 2010/0207751 A1 | 8/2010 | Follmer et al. | |
| 2010/0305846 A1* | 12/2010 | Tachihana | G01C 21/3605 |
| | | | 701/533 |
| 2011/0012773 A1* | 1/2011 | Cunning | G01S 7/20 |
| | | | 342/52 |
| 2011/0054785 A1* | 3/2011 | Wood | G01C 21/00 |
| | | | 701/533 |
| 2012/0232719 A1* | 9/2012 | Salmon | G05D 1/0206 |
| | | | 701/2 |
| 2013/0138342 A1* | 5/2013 | Zaid | G01C 21/206 |
| | | | 701/526 |
| 2013/0173155 A1* | 7/2013 | Fino | G01C 21/20 |
| | | | 701/533 |
| 2014/0071167 A1* | 3/2014 | Lauenstein | G06T 17/05 |
| | | | 345/634 |

* cited by examiner

SYSTEMS AND METHODS FOR REPORTING OBJECTS OF INTEREST

BACKGROUND

The field of the disclosure relates generally to navigational charts, and more specifically, to systems used to report objects of interest to be included in navigational charts.

For vehicles operating in, or on, a body of water, such as a boat, a chart plotter may be used to display one or more navigational charts. The displayed charts assist a user in navigating the vehicle through the body of water. At least some known charts indicate the location of one or more objects of interest. For example, if the object of interest is an obstacle, the user can use the navigational chart to avoid the obstacle.

However, at least some objects of interest may not be included in a displayed chart, or may be indicated in inaccurate locations. For example, an older chart may not include an object of interest that appeared more recently. Further, some objects of interest may move over time. Moreover, some objects of interest may not be included in a chart simply because they were previously unknown to exist.

Accordingly, users may report an object of interest so that the object may be included in a new or updated navigational chart. However, in at least some known reporting systems, the user reports an object by calling a human operator and describing the object, and/or by composing and sending an email that describes the object. Such a process may be relatively time-consuming for the user, and accordingly, the user may decide it is not worth the time or effort to report the object. Further, in at least some known reporting systems, the only information collected regarding the object is a coordinate location of the object, thus making it difficult to verify the existence of the object.

BRIEF DESCRIPTION

In one aspect, a computing device is provided. The computing device includes a user interface configured to receive an input that indicates a user has detected an object of interest in a body of water, a processing device coupled to the user interface, the processing device configured to automatically retrieve, in response to the input, data from at least one data source, and generate a report including the retrieved data, and a means for transferring data coupled to the processing device and configured to transmit the generated report to a database that includes a plurality of navigational charts, wherein the generated report is used to update at least one of the database and at least one of the plurality of navigational charts to include the object of interest.

In another aspect, a system for reporting an object of interest is provided. The system includes at least one data source, a computing device communicatively coupled to the at least one data source, the computing device configured to automatically retrieve, in response to an input that indicates a user has detected the object of interest in a body of water, data from said at least one data source, and generate a report including the retrieved data, and a database including a plurality of navigational charts updatable, using the generated report, to include the object of interest.

In yet another aspect, a method for reporting an object of interest is provided. The method includes receiving, at a processing device, an indication that a user has detected an object of interest in a body of water, automatically retrieving, in response to the indication, data from at least one data source, generating, using the processing device, a report including the retrieved data, and updating, using the generated report, at least one of a database and a navigational chart to include the object of interest.

The features, functions, and advantages that have been discussed can be achieved independently in various implementations or may be combined in yet other implementations, further details of which can be seen with reference to the following description and drawings.

DETAILED DESCRIPTION

The systems and methods described herein enable reporting an object of interest such that navigational charts may be updated to include the object of interest in a timely and efficient manner. In the exemplary implementation, a chart plotter receives an indication from a user that an object of interest has been detected, and in response, the chart plotter retrieves data from one or more data sources to generate a report including that data. The report can be used to update navigational charts to include the object of interest.

Technical effects of the methods and systems described herein include at least one of: (a) receiving an indication that a user has detected an object of interest in a body of water; (b) automatically retrieving, in response to the indication, data from at least one data source; (c) generating a report including the retrieved data; (d) transmitting the generated report to a database; and (e) updating at least one navigational chart in the database to include the object of interest.

Figure 1:
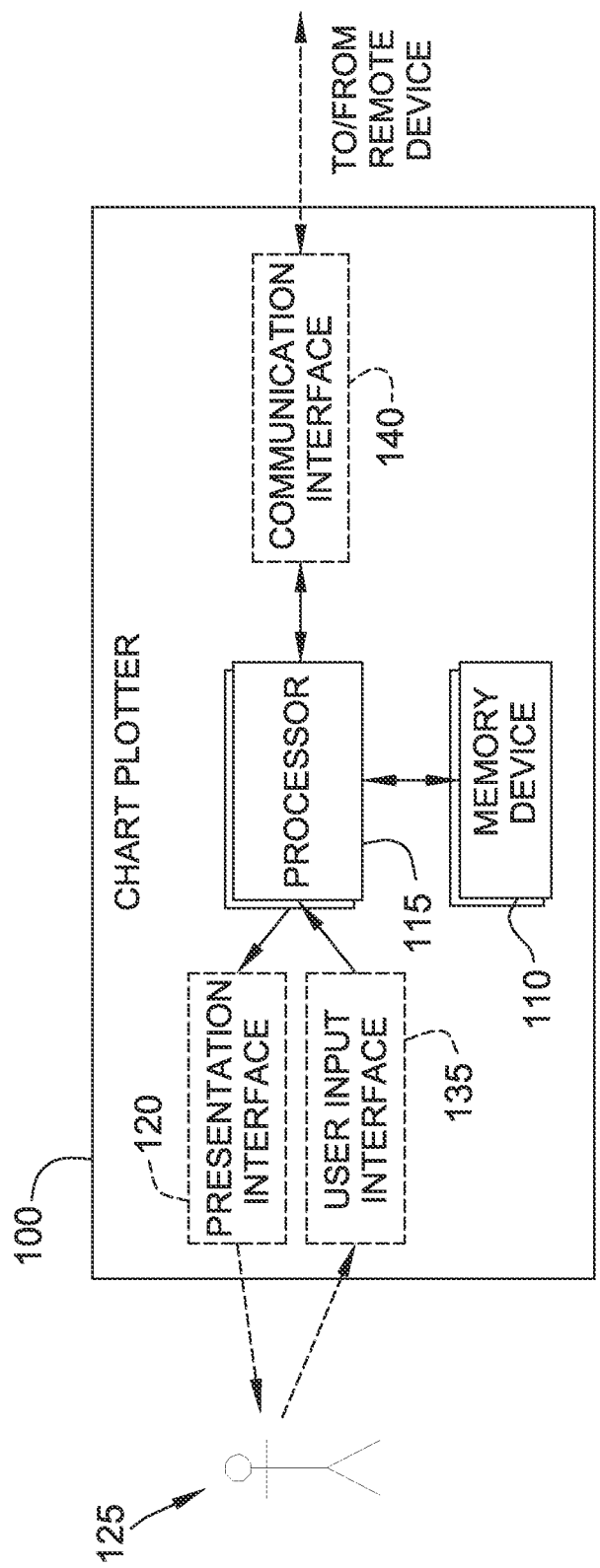
FIG. 1 is a block diagram of an exemplary chart plotter that may be used to report an object of interest.

FIG. 1 is a block diagram of an exemplary chart plotter 100 that may be used to report an object of interest. Although referred to herein as a chart plotter, chart plotter 100 may be any computing device capable of performing the functions described herein. Chart plotter 100 includes at least one memory device 110 and a processor 115 that is coupled to memory device 110 for executing instructions. In some implementations, executable instructions are stored in memory device 110. In the exemplary implementation, chart plotter 100 performs one or more operations described herein by programming processor 115. For example, processor 115 may be programmed by encoding an operation as one or more executable instructions and by providing the executable instructions in memory device 110.

Processor 115 may include one or more processing units (e.g., in a multi-core configuration). Further, processor 115 may be implemented using one or more heterogeneous processor systems in which a main processor is present with secondary processors on a single chip. In another illustrative example, processor 115 may be a symmetric multi-processor system containing multiple processors of the same type. Further, processor 115 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary implementation, processor 115 generates a report that identifies an object of interest, as described herein.

In the exemplary implementation, memory device 110 is one or more devices that enable information such as executable instructions and/or other data to be stored and retrieved. Memory device 110 may include one or more computer readable media, such as, without limitation, dynamic random access memory (DRAM), static random access memory (SRAM), a solid state disk, and/or a hard disk. Memory device 110 may be configured to store, without limitation, application source code, application object code, source code portions of interest, object code portions of interest, configuration data, execution events and/or any other type of data.

In the exemplary implementation, chart plotter 100 includes a presentation interface 120 that is coupled to processor 115. Presentation interface 120 presents information, such as navigational charts, to a user 125. For example, presentation interface 120 may include a display adapter (not shown) that may be coupled to a display device, such as a cathode ray tube (CRT), a liquid crystal display (LCD), an organic LED (OLED) display, and/or an "electronic ink" display. In some implementations, presentation interface 120 includes one or more display devices.

In the exemplary implementation, chart plotter 100 includes a user input interface 135. User input interface 135 is coupled to processor 115 and receives input from user 125. User input interface 135 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 120 and user input interface 135.

Chart plotter 100, in the exemplary implementation, includes a communication interface 140 coupled to processor 115. Communication interface 140 communicates with one or more remote devices. To communicate with remote devices, communication interface 140 may include, for example, a wired network adapter, a wireless network adapter, and/or a mobile telecommunications adapter.

Figure 2:
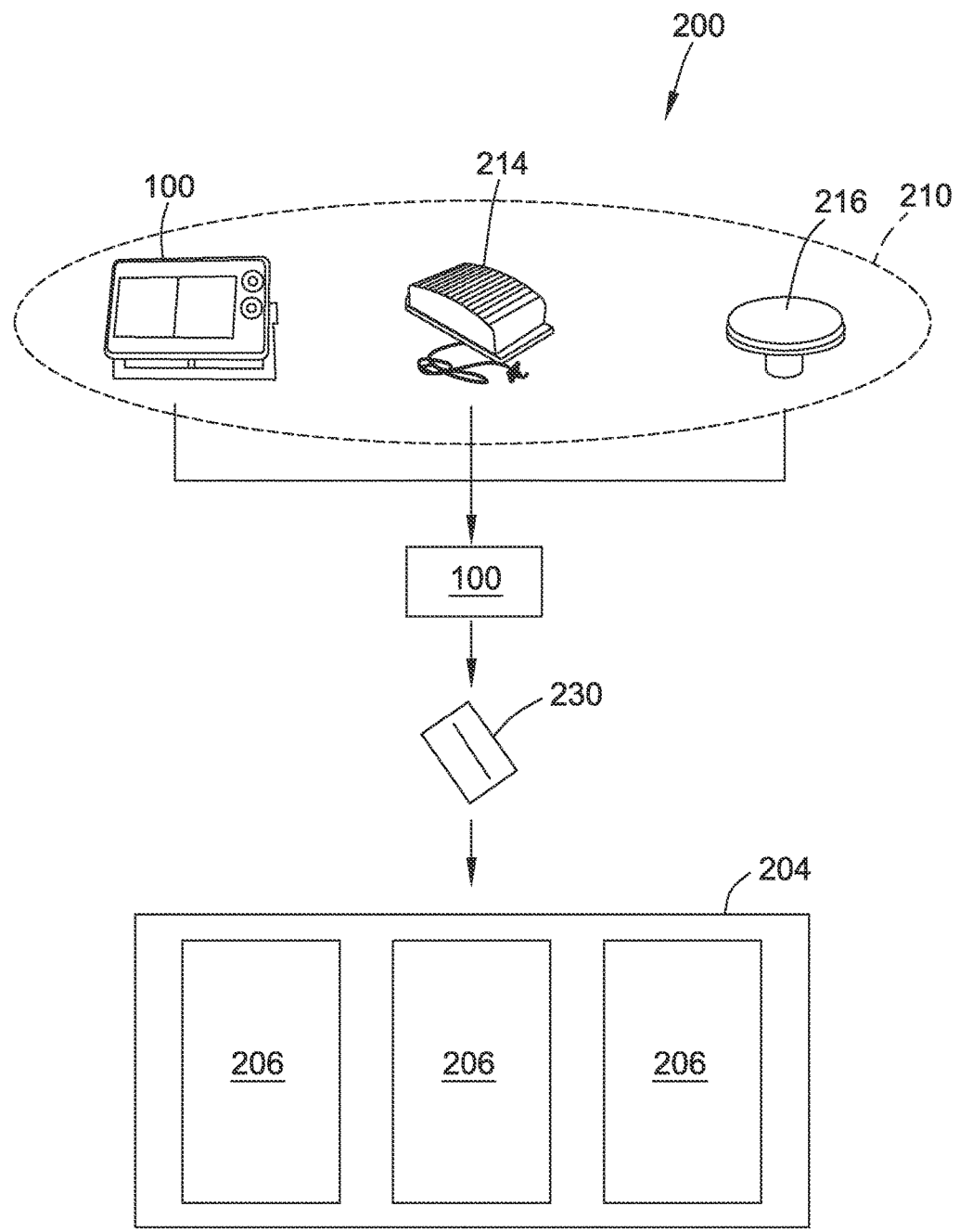
FIG. 2 is a schematic diagram of an exemplary system for use in reporting an object of interest using the chart plotter shown in FIG. 1.

FIG. 2 is a schematic diagram of a system 200 that may be used to report objects of interest (not shown) using that includes chart plotter 100. Chart plotter 100 generates a report identifying an object of interest, as described in detail herein. Each report is provided to a database 204, such as, for example, a cartographic and/or hydrographic database. Database 204 and/or applicable charts 206 stored in database 204 may be updated using the information contained in the report.

In the exemplary implementation, chart plotter 100 is onboard a vehicle (not shown) operating in, or on, a body of water, such as a boat. The body of water may any type of body of water (e.g., a lake, river, ocean, etc.). Chart plotter 100 displays one or more navigational charts on presentation interface 120 (shown in FIG. 1) to assist user 125 (shown in FIG. 1) in navigating the vehicle in the body of water. Charts may be stored in, for example, memory device 110 (shown in FIG. 1). Chart plotter 100 may use navigational data, such as global positioning system (GPS) data to determine which charts should be displayed. Alternatively, chart plotter 100 may selectively display charts based on an input by user 125 via user input interface 135.

To assist in navigation, charts displayed on chart plotter 100 may include one or more objects of interest. For example, a chart may indicate the location of an obstacle in the body of water. By observing the obstacle on the displayed chart, user 125 can operate the vehicle to avoid the obstacle. In another example, the object of interest could be a shipwreck, and using chart plotter 100, scuba divers could locate the shipwreck.

As used herein, an object of interest may include any feature, item, and/or landmark that could be displayed or otherwise indicated on a navigational chart. For example, an object of interest could include a rock formation, a tree stump, a shipwreck, debris, a cargo container, or a sandbar. The object of interest could be located on the surface of a body of water or at least partially submerged in the body of water.

At least some objects of interest may not be included in a displayed chart, or may be indicated in inaccurate locations. For example, if a cargo container fell off a barge and settled at the bottom of a river after the latest version of a chart was released, the cargo container would not be included in the chart. Further, some objects of interest, such as sandbars, may move over time, making older charts outdated. Moreover, some objects of interest may have existed at the time the chart was created, but simply may not have been discovered to be included in the chart. Accordingly, when user 125 observes an object of interest, visually or with the assistance of instrumentation, that is missing or that is shown in the wrong location on a chart, system 200 enables user 125 to report the object of interest, such that the reported object of interest can be included in new or updated charts in an efficient manner.

In the exemplary implementation, chart plotter 100, and more specifically, processor 115 (shown in FIG. 1), generates a report identifying an object of interest. The report includes data from one or more data sources 210. In the exemplary implementation, data sources 210 include chart plotter 100 itself, a depth transducer 214 (or a fish finder), and a navigation system 216. Alternatively, data sources 210 may include any other device capable of supplying data to chart plotter 100 for use in generating reports as described herein.

In the exemplary implementation, the report includes configuration data associated with the chart plotter 100. For example, such configuration data may include a device identification number (e.g., serial number) of chart plotter 100 and/or a chart code that identifies a chart corresponding to the location of the object (i.e., identifies the chart covering the area where the object of interest is located). The chart code also indicates the release date of the chart (i.e., a time stamp indicating how old the chart is). The device identification number and chart code may be stored in, for example, memory device 110.

The report also includes transducer data from depth transducer 214 in the exemplary implementation. Transducer data may include, for example, a depth value of the object recorded using depth transducer 214, and/or a screenshot of a data page from depth transducer 214.

In the exemplary implementation, the report also includes navigation data from navigation system 216. Navigation system 216 may be integrated into the vehicle on which chart plotter 100 is operated. Navigation data may include, for example, a coordinate location (e.g., latitude and longitude) of the object of interest, the date the object was located, the time the object was located, a speed over ground (SOG) of the vehicle when the object was located, and a course over ground (COG) when the object was located. Notably, the specific types of data listed herein for inclusion in the report are merely exemplary. In other implementations, the report may include any set of data that facilitates identifying and locating an object of interest.

In the exemplary implementation, chart plotter 100 is coupled to data sources 210 via communication interface 140 (shown in FIG. 1). Accordingly, chart plotter 100 can automatically retrieve data for the report directly from data sources 210. Alternatively, in implementations where chart plotter 100 is not coupled to data sources 210, user 125 can manually input data from data sources 210 into chart plotter 100.

In the exemplary implementation, chart plotter 100 automatically retrieves data from data sources 210 in response to a user input using, for example, user input interface 135 (shown in FIG. 1). That is, when user 125 observes, visually or with the assistance of instrumentation, an object of interest that is missing or shown in the wrong location on chart plotter 100, user 125 can enter an input that causes chart plotter 100 to automatically retrieve data from data sources 210 to generate an associated report. User 125 may also supplement the report with additional data using user input interface 135. For example, when generating the report, chart plotter 100 may request (e.g., via prompts displayed on presentation interface 120) that the user supply a category of the object of interest (e.g., shipwreck, debris, tree stump, sandbar) and/or a name for the object of interest.

The report generated by chart plotter 100 is provided to database 204. In the exemplary implementation, the generated report is encrypted and stored as a file on a memory card 230. In at least some implementations, memory card 230 functions as memory device 110. Memory card 230 may include, for example a secure digital (SD) card or a universal serial bus (USB) storage device. Using memory card 230, user 125 can upload the generated report file to database 204 over a wired or wireless network, or provide memory card 230 to a human operator responsible for managing database 204.

Alternatively, the report may be supplied to database 204 using any other suitable transmission means. For example, using communication interface 140, chart plotter 100 may transmit the generated report directly to database 204 over any suitable communication means, including wired or wireless networks. Further, the report may be automatically transmitted upon communication interface 140 establishing a communications link with database 204, or in response to a user input. As used herein, transmitting the report to database 204 includes using memory sticks, memory cards, a wired network, a wireless network, and/or any other suitable means to transfer data from chart plotter 100 to database 204.

In the exemplary implementation, a human operator determines whether charts 206 stored in database 204 should be updated to include the reported object of interest. For example, to verify the accuracy of a reported object of interest, charts 206 may only be updated after two or more reports identifying the object of interest are received. Further, the data in reports may be indicative of the accuracy of the report. For example, if a report indicates that an object of interest was located while the vehicle was travelling at a relatively high speed over ground, data obtained by depth transducer 214 in the same report may be inaccurate. Alternatively, the report supplied from chart plotter 100 may be used to automatically update pertinent charts 206 in database 204.

In at least some implementations, the report is stored in an additional database (not shown). The report may be downloaded from the additional database to chart plotter 100 as value added data such that the object of interest in the report is included in charts displayed on chart plotter 100. In one implementation, user 125 can select, using user input interface 135, whether or not to display the value added data on chart plotter 100 (i.e., turn display of the value added data on and off). Once the report is used to update database 204 and/or charts 206, the report may be removed from the intermediate database.

Charts 206 stored in database 204 and updated with objects of interest from one or more reports may be used in a variety of applications. For example, charts 206 may be provided to user 125 as updates for chart plotter 100. Charts 206 may be used for marine navigation including, for example, leisure sailing, fishing, and/or finding locations of interest for scuba diving/snorkeling. Further charts 206 may be used in software applications for mobile devices (e.g., smart phones, tablets) and geographic information systems implemented using a computing device. In at least some embodiments, database 204 is updated from the reports, and database 204 itself is provided to customers (e.g., user 125). Further, in some implementations, a generated report could be provided to multiple databases 204 each including different sets of charts 206.

In some implementations, to incentivize user 125 to report objects of interest, user 125 may receive a reward in exchange for supplying a report to database 204. For example, user 125 may receive an updated chart including the reported object for free or at a discounted rate.

Figure 3:
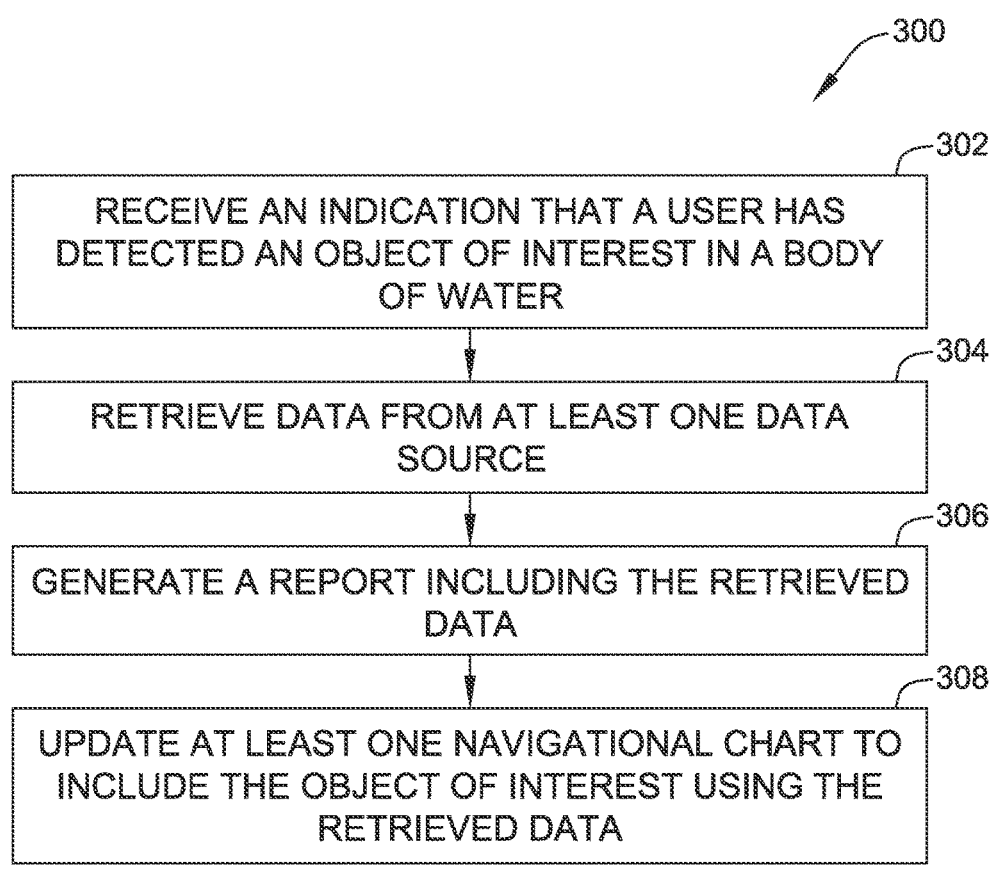
FIG. 3 is a flow chart of an exemplary method that may be used with the system shown in FIG. 1.

FIG. 3 is a flowchart of an exemplary method 300 for use in reporting an object of interest. An indication is received 302 at a processing device, such as processor 115 (shown in FIG. 1), that a user has detected an object of interest in a body of water. In response to the indication, data from at least one data source, such as data sources 210 (shown in FIG. 2), is automatically retrieved 304. A report including the retrieved data is generated 306 by the processing device. At least one navigational chart, such as charts 206 (shown in FIG. 2), is updated 308 to include the object of interest using the generated report.

The implementations described herein enable an object of interest to be easily reported such that navigational charts may be updated to include the object of interest. When a chart plotter receives an indication from a user that an object of interest has been detected, the chart plotter automatically retrieves data from one or more data sources and generates a report that includes the new data. The report can be used to update navigational charts to include the object of interest.

Unlike at least some known reporting systems that require a user to interface with an operator and/or send an email, the systems and methods described herein enable data to be collected and reported easily such that a report may be generated that identifies an object of interest with relatively little user input. Further, as compared to at least some known reporting systems, in which only coordinates of the object of interest are reported, in the systems and methods described herein, the report includes additional data that assists in locating and identifying the object.

The implementations described herein may utilize executable instructions embodied in a computer readable medium, including, without limitation, a storage device or a memory area of a computing device. Such instructions, when executed by one or more processors, cause the processor(s) to perform at least a portion of the methods described herein. As used herein, a "storage device" is a tangible article, such as a hard drive, a solid state memory device, and/or an optical disk that is operable to store data.

Although specific features of various implementations of the invention may be shown in some drawings and not in others, this is for convenience only. In accordance with the principles of the invention, any feature of a drawing may be referenced and/or claimed in combination with any feature of any other drawing.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computing device comprising:
    a user input interface for receiving an input that indicates a user has detected an object of interest in a navigable body of water, wherein the input is associated with a location of the object of interest in the navigable body of water, and wherein the object of interest is at least one of missing or shown in a different location on at least one navigation chart;
    a processor coupled to said user input interface, said processor is programmed to:
        receive, from the user input interface, the input from the user indicating the location of the object of interest that is at least one of missing or shown in a different location on at least one navigation chart;
        automatically retrieve, in response to the input, data about the location from one of a depth transducer and a fish finder, wherein the data includes a screenshot of a data page of the one of the depth transducer and the fish finder;
        retrieve chart data associated with the location; and
        generate a report including the retrieved data and the chart data; and
    communication interface for transmitting the generated report to a database that includes a plurality of navigational charts, said communication interface coupled to said processor, wherein the generated report is used to update at least one of the database and at least one of the plurality of navigational charts to include the object of interest based on at least one of an accuracy of the generated report and a plurality of reports received associated with the object of interest.

2. A computing device in accordance with claim 1, wherein said user input interface further receives an input from the user that identifies at least one of a name of the object of interest and a category of the object of interest, and wherein said processor is further programmed to generate a report that includes the at least one of the name and the category of the object of interest.

3. A computing device in accordance with claim 1, wherein said computing device further comprises a memory communicatively coupled to said processor, and wherein to automatically retrieve data from at least one data source, said processor is further programmed to automatically retrieve data from said memory.

4. A computing device in accordance with claim 3, wherein to automatically retrieve data from said memory, said processor is further programmed to automatically retrieve at least one of a device identification number of said computing device and a chart code for a chart covering an area that includes the object of interest.

5. A computing device in accordance with claim 1, wherein to automatically retrieve data from at least one data source, said processor is further programmed to automatically retrieve data from a navigation system.

6. A computing device in accordance with claim 5, wherein to automatically retrieve data from a navigation system, said processor is further programmed to automatically retrieve at least one of a speed over ground (SOG) of a vehicle from which the object of interest is detected, and a course over ground (COG) of the vehicle from which the object of interest is detected.

7. A system for reporting an object of interest, said system comprising:
    at least one data source;
    a computing device communicatively coupled to said at least one data source, said computing device programmed to:
        receive, from a user input interface, an input from a user indicating a location of the object of interest that is at least one of missing or shown in a different location on at least one navigation chart;
        automatically retrieve, in response to the input that indicates a user has detected the object of interest in a navigable body of water, data about the location from said at least one data source, wherein the input is associated with a location of the object of interest in the navigable body of water, wherein the at least one data source includes one of a depth transducer and a fish finder, and wherein the data includes a screenshot of a data page of the one of the depth transducer and the fish finder;
        retrieve chart data associated with the location; and
        generate a report including the retrieved data and the chart data; and
    a database including a plurality of navigational charts updatable, using the generated report, to include the object of interest based on at least one of an accuracy of the report and a plurality of reports received associated with the object of interest.

8. A system in accordance with claim 7, wherein the object of interest is at least one of a rock formation, a tree stump, a shipwreck, debris, a cargo container, and a sandbar.

9. A system in accordance with claim 7, wherein said at least one data source includes a chart plotter, and wherein the data includes at least one of a device identification number of said chart plotter and a chart code for a chart covering an area that includes the object of interest.

10. A system in accordance with claim 7, wherein said at least one data source is a navigation system, and wherein the data includes at least one of a speed over ground (SOG) of a vehicle from which the object of interest is detected, and a course over ground (COG) of the vehicle from which the object of interest is detected.

11. A system in accordance with claim 7, wherein said computing device is further programmed to transmit the generated report to said database over at least one of a wired network and a wireless network.

12. A method for reporting an object of interest, said method comprising:
    receiving, at a processing device, an indication that a user has detected an object of interest in a navigable body of water that is at least one of missing or shown in a different location on at least one navigation chart, wherein the indication is associated with a location of the object of interest in the navigable body of water;
    automatically retrieving, in response to the indication, data about the location from one of a depth transducer and a fish finder, wherein the data includes a screenshot of a data page of the one of the depth transducer and the fish finder;

retrieving chart data associated with the location;

generating, using the processing device, a report including the retrieved data and the chart data; and updating, using the generated report, at least one of a database and a navigational chart to include the object of interest based on at least one of an accuracy of the generated report and a plurality of reports received associated with the object of interest.

13. A method in accordance with claim 12, further comprising transmitting the generated report to the database, wherein the at least one navigational chart is stored in the database.

14. A method in accordance with claim 12, wherein automatically retrieving data further comprises automatically retrieving, from a chart plotter, at least one of a device identification number of the chart plotter and a chart code for a chart covering an area that includes the object of interest.

15. A method in accordance with claim 12, wherein automatically retrieving data comprises automatically retrieving, from a navigation system, at least one of a speed over ground (SOG) of a vehicle from which the object of interest is detected, and a course over ground (COG) of the vehicle from which the object of interest is detected.

16. A method in accordance with claim 12, further comprising receiving, at the processing device, user input including at least one of a name and a category of the object of interest, wherein the generated report includes the at least one of the name and the category of the object of interest.

* * * * *